US006990517B1

(12) United States Patent
Bevan et al.

(10) Patent No.: US 6,990,517 B1
(45) Date of Patent: Jan. 24, 2006

(54) SYNCHRONIZATION MODELLING USING TEMPLATES AND NETWORK MANAGEMENT SYSTEM

(75) Inventors: Andrew G Bevan, Enfield (GB); Nigel R Davis, London (GB); Richard Borrett, St Albans (GB)

(73) Assignee: Nortel Networks Limited, St. Laurent (CA)

( * ) Notice: Subject to any disclaimer, the term of this patent is extended or adjusted under 35 U.S.C. 154(b) by 507 days.

(21) Appl. No.: 09/385,938

(22) Filed: Aug. 30, 1999

(30) Foreign Application Priority Data

Apr. 30, 1999 (GB) .................................. 9910131

(51) Int. Cl.
*G06F 15/177* (2006.01)
(52) U.S. Cl. ...................................... 709/223; 709/248
(58) Field of Classification Search ................ 709/248, 709/230, 223, 224, 251, 232
See application file for complete search history.

(56) References Cited

U.S. PATENT DOCUMENTS

| 5,651,006 | A  | * | 7/1997  | Fujino et al. ................ 370/408 |
| 5,983,226 | A  | * | 11/1999 | Commerford, Jr. et al. ..... 707/8    |
| 6,081,550 | A  | * | 6/2000  | Wolf .......................... 375/224 |
| 6,134,234 | A  | * | 10/2000 | Kapanen ...................... 370/350 |
| 6,205,121 | B1 | * | 3/2001  | Heuer ......................... 370/250 |
| 6,324,586 | B1 | * | 11/2001 | Johnson ....................... 709/248 |
| 6,330,601 | B1 | * | 12/2001 | French et al. ................ 709/223 |
| 6,400,702 | B1 | * | 6/2002  | Meier ......................... 370/338 |

* cited by examiner

*Primary Examiner*—Dung Dinh
(74) *Attorney, Agent, or Firm*—Barnes & Thornburg LLP (57) ABSTRACT

The present invention relates to network management where monitoring and control of the synchronization path for each network element is currently provided for in a manual and ad hoc manner. The present invention provides a method of providing management data describing synchronization trial information for network elements in a communications network.

5 Claims, 7 Drawing Sheets

SYNCHRONIZATION MODELLING USING TEMPLATES AND NETWORK MANAGEMENT SYSTEM

FIELD OF THE INVENTION

The present invention relates to network management and particularly, although not exclusively, to management of a communications network.

BACKGROUND TO THE INVENTION

A conventional communications network, for example a broadband communications network comprises a plurality of physical resources, e,g. switches, cross-connects, regenerators, repeaters, transmission links such as fibre optic links or coaxial cable links, operating under control of a plurality of logical resources, e.g. transport protocols, and local controls associated with individual physical resources. The physical resources are located at a plurality of nodes or network elements and links which are distributed over a geographical area. A network operator maintains control of a communications network for its operation, administration and maintenance, utilising a management information base which stores information describing the physical and logical resources within the network. The management information base describes each network element within the network, which in a conventional network may be in the order of hundreds of individual network elements, e.g. switches, cross-connects, regenerators, each of which contains of the order of tens to hundreds of cards, having processes, line terminations, buffers, registers, switch fabrics, etc. In general, a conventional communications network may comprise a multitude of different legacy equipment types of different proprietary manufacture, each of which has its own particular internal configuration and offers its own specific capability.

The information in the management information base is used to assist the network operator to identify and locate problems within the network such as a broken transmission link or failed processor for example.

The International Telegraph and Telephone Consultative Committee (CCITT) of the International Telecommunications Union (ITU) in their Recommendation G.774 published September 1992 (available from International Telecommunications Union, General Secretariat, Sales Service, Place de Nation, Ch1211, Geneva 20, Switzerland), specifies a recommended architecture of an information model for Synchronous Digital Hierarchy (SDH) network. In Recommendation G.774, there is specified a model which describes managed object classes and their properties which are useful for describing information exchanged across interfaces to find in Recommendation M.3010, Telecommunications Network Management (TNM) architecture, also of the ITU-T. Recommendation G.774 identifies the Telecommunications Management Network (TMN) object classes required for the management of SDH network elements, and specialises the generic object classes presented in Recommendation M.3010 to provide management information specifically for synchronous digital hierarchy. These objects are relevant to information exchanged across standardised interfaces defined in Recommendation M.3010 TMN architecture. In Recommendation G.774, network resources are modelled as objects and a management view of a resource is referred to as a managed object. Objects with similar attributes may be grouped in object classes. An object is characterised by its object class and object instance, and may possess multiple attribute types and associated values. Object class is defined in Recommendation G.774 applied to various management areas, for example fault management and configuration management.

Existing methods of obtaining information and managing the synchronisation of synchronous networks rely on network elements within the network selecting the network element connected to it with the best source of synchronisation information. A number of parameters are used to determine the quality of the synchronisation information from each connected NE including the received waveform shape and the number of NE's in the synchronisation trail back to a Primary Reference Source (PRS)—a single definitive timing input into the network. Such an arrangement is described in Jamasebi UK Patent Application No. 9605013.3. WO 97/33396.

Occasionally sync problems occur on the network caused by for example an optical fibre link between NE's being broken, which results in some NE's within the network drifting off sync with the rest of the network. This problem is dealt with by interrogating the problem NE's to determine their synchronisation sources and, if appropriate, re-assign their synchronisation sources to correct the problem.

OBJECT OF THE INVENTION

It is a further object of the present invention to provide an improved method of providing synchronisation information for a communications network.

SUMMARY OF THE INVENTION

In a first aspect the present invention provides in a communications network comprising a plurality of network elements, a method of providing management data describing synchronisation trail information for said network elements, said method comprising the steps of:
   obtaining network element synchronisation data;
   obtaining network element connectivity data;
   deriving synchronisation trail information for said network elements from said synchronisation data and said connectivity data.

In a second aspect the present invention provides a data representation of a physical resource operating in accordance with a protocol having a plurality of layers, the representation further comprising a timing layer representing synchronisation trail information.

In a third aspect the present invention provides in a communications network comprising a plurality of network elements, said network elements comprising a plurality of physical resources organised into a plurality of types of pre-configured structures, a method of providing management data describing synchronisation trail information of said network elements, comprising the steps of:
   representing said plurality of physical resources by a plurality of reference data;
   and representing synchronisation trails within said network by a plurality of synchronisation reference data.

In a fourth aspect the present invention provides a management system of managing synchronisation for a network comprising a plurality of physical resources, said system comprising:
   data storage means for storing;
   reference data representing connectivity between said resources;
   and synchronisation reference data representing synchronisation trails to each resource.

In a fifth aspect the present invention provides a method of exploring synchronisation trails within a network comprising a plurality of network elements, the method comprising the steps of:

obtaining network element synchronisation data;
   obtaining network element connectivity data;
   deriving synchronisation trail information from a network element and following the trail to the synchronisation source of the element, using said synchronisation data and said connectivity data.

In a sixth aspect the present invention provides a method of displaying information relating to synchronisation trails within a network comprising a plurality of network elements, said method comprising:

obtaining network element synchronisation data;
   obtaining network element connectivity data;
   deriving synchronisation trail information for said network elements from said synchronisation data and said connectivity data;
   for each synchronisation trail, displaying in graphical form the synchronisation trail information from a network element and following the trail to the synchronisation source of the element.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE DRAWINGS

There will now be described by way of example the best mode contemplated by the inventors for carrying out the invention. In the following description numerous specific details are set forth in order to provide a thorough understanding of the present invention. It will be apparent however, to one skilled in the art, that the present invention may be practised without using the specific details. In other instances, one own methods instructures have not been described in detail so as not to unnecessarily obscure the present invention.

In the following discussion, a best mode implementation of the invention is described with reference to Synchronous Digital Hierarchy (SDH) system. However, it will be understood that the scope of the invention is not restricted to SDH systems, but extends over any network of physical and logical resources in the telecommunications or computer networks domains having a management information system. Networks operating Asynchronous Transfer Mode (ATM), Synchronous Optical Network (SONET), Integrated Service Digital Network (ISDN) and SDH are specific examples of such networks. However, the invention is not restricted to networks operating these specific protocols.

Within the following description, references are made to terms defined in International Telecommunications Union (ITU-T) Recommendations G.803 and G.805.

Figure 1:
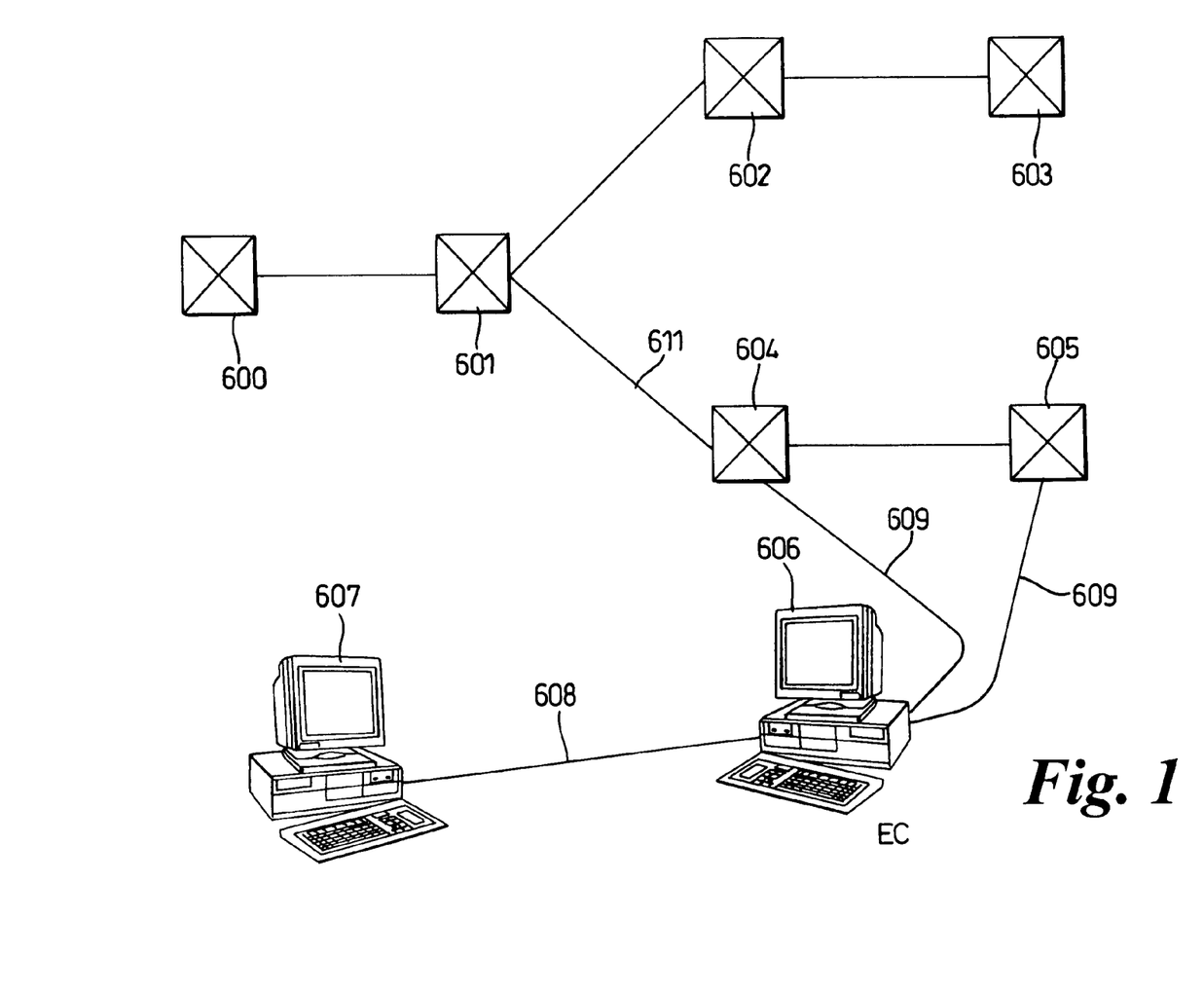
FIG. 1 shows a communications network to which the invention may be applied.
Figure 2:
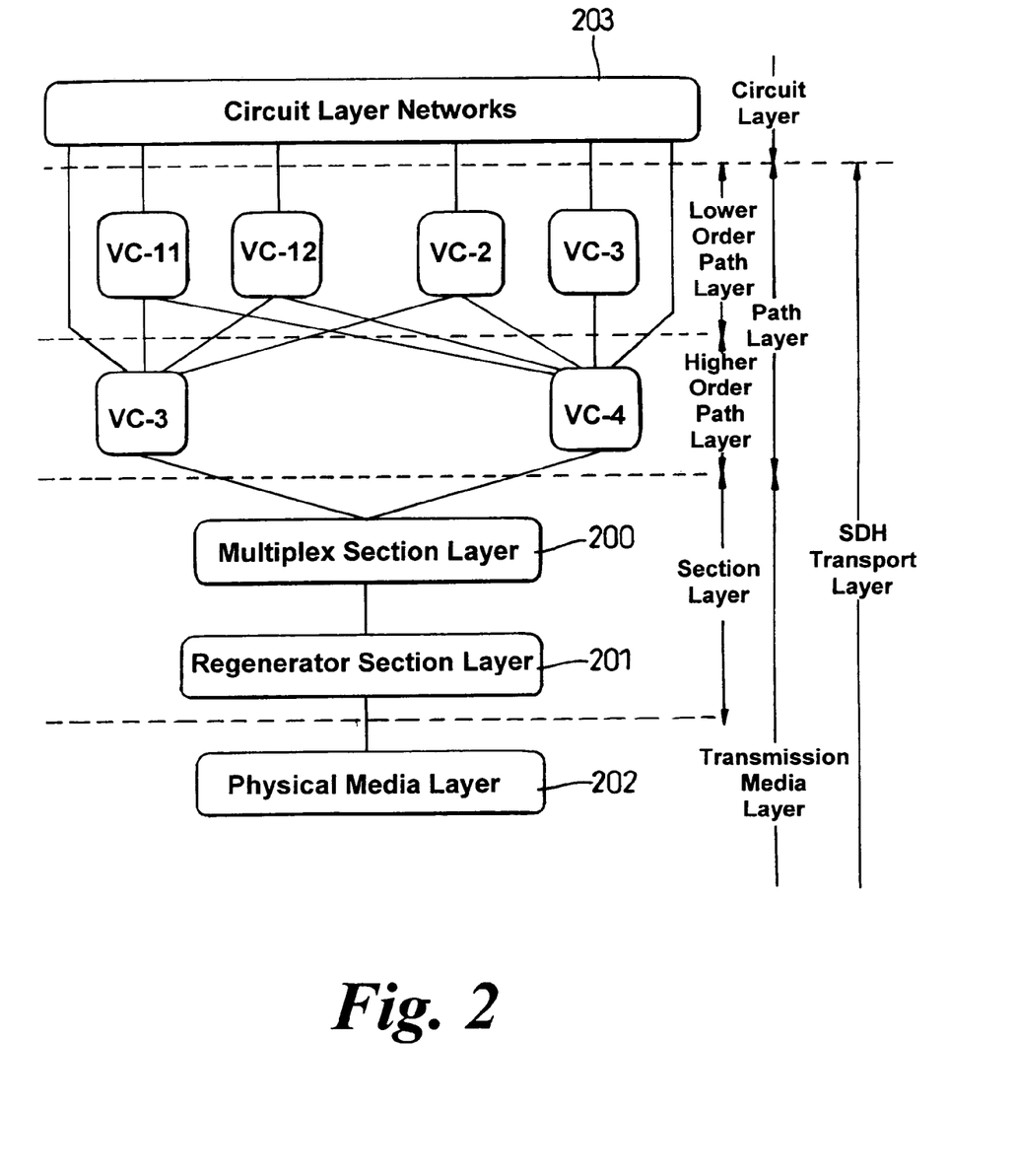
FIG. 2 shows the network modelled as multiple layered networks according to the G.803 SDH based transport layered model.

Referring to FIG. 1, an example of a communications network to which the synchronisation management arrangement of the invention can be applied. The network elements 600–605 contained in the network may be from different vendors or manufacturers. The network comprises multiple layer networks for example virtual container 12 VC12 or VC4 as described in G.803 and shows schematically in FIG. 2.

A connection may be provided across the network for a client by the network operator using a network management system 607. The connection will typically span more than one layer network. A trail connects termination points across a layer network in order to convey information between the two termination points. In order to manage the trails the network is provided with a trail manager which forms part of the network management system 607. The trail manager comprises a trail database which stores data describing connections among trail termination points and different layer networks such that a complete client connection can be described. The trail manager manages the network establishing, modifying and releasing connections among the termination points in response to client requests.

Synchronisation refers to the requirement that the transmit and receive ends of the connection operate at the same clock rate so that bits are not misread. The receiver may derive its timing from the incoming line or from an external source for example to achieve bit synchronisation.

Synchronisation for an SDH network is provided from at least one Primary Reference Source (PRS) or Clocks (PRC). The signal is passed through the SDH network elements and can be regenerated with Synchronisation Source/Distribution Units (SSUs).

The objective of synchronisation is to keep timing of the source and receive clocks in step. Differences in timing at network elements within a network will cause the receiving NE to either drop or reread information sent to it. This is referred to as slip. Other symptoms of misalignment of the synchronisation are jitters and wanders which can be caused by laser and clock rates changing.

The present invention provides the ability to view the network synchronisation plan or the synchronisation path or trail for each NE in the network. The invention also provides analysis of the path by looking for loops, islands and number of hops between NE and an external source as these might cause the above problems.

The network synchronisation plan can be defined as a series of synchronisation paths (one for each NE in the network) or trails within an additional layer network (the timing layer or section) which describe the synchronisation of the network. A synchronisation path for an NE describes the connectivity between the NE and its synchronisation Primary Reference Source, by depicting all the NE's involved in the path, linked together in a chain back to the PRS. The synchronisation plan also includes the sync source hierarchy for each NE and any available quality levels associated with each source.

A synchronisation loop occurs in the network when an NEs timing source or reference can be traced back to itself. A synchronisation island occurs when an NE or a group of NEs does not have the sync source or reference connected to the rest of the network or a Primary Reference Source.

The Synchronisation Manager (SM) obtains the following data on NE's within the network:

the active input timing signal.

the input timing signal priorities (e.g. primary, secondary sources etc.).

the output timing signals.

the quality levels of the input and output signals.

In addition, the SM requires physical connectivity data for the complete network, including the Sync Source Units. This must either be provided by the user using a trail database for example or the Synchronisation Manager may be integrated into a Trail Manager application which is able to provide this data.

Figure 3:
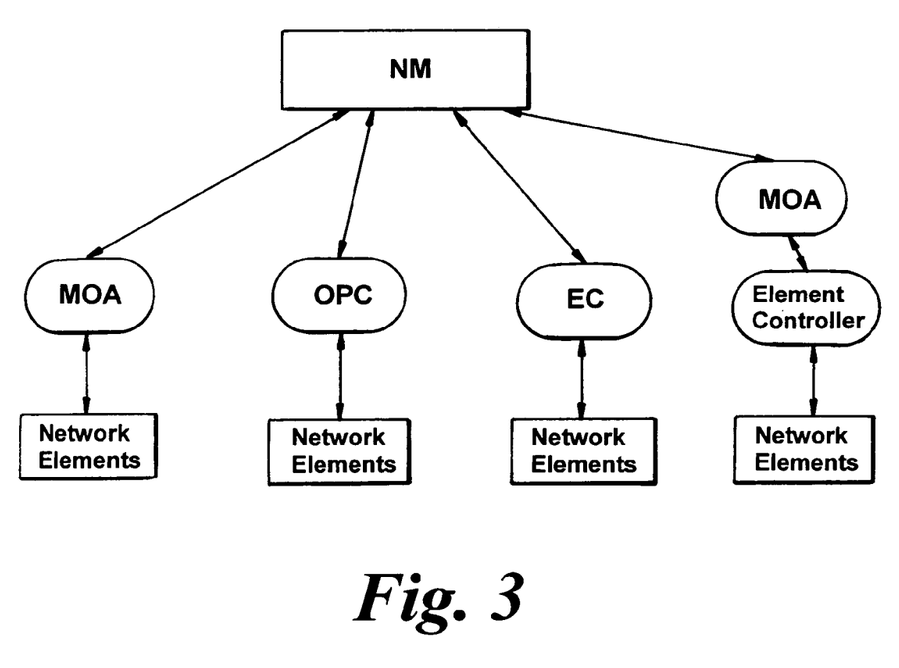
FIG. 3 shows the network management architecture of the network.

The Sync information is gathered from the network by Managed Object Agents MOAs which are related to different types of NEs. Within an element controller, a managed object agent (MOA) implements management of the network elements according to instructions received from a network manager. The managed object agent uses data in the templates to manage the network elements. The sync information is transported up to the Trail Database whereupon the SM processes and analyses this data to derive the sync plan of the network, which can be displayed to a requesting user on the User Interface. FIG. 3 shows the architecture involved in this mechanism.

Figure 4:
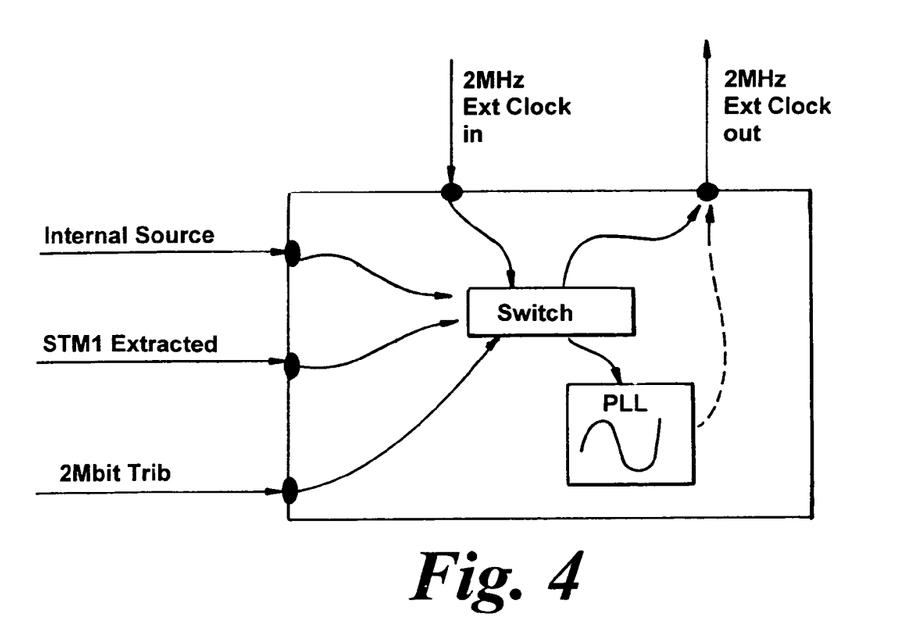
FIG. 4 shows the synchronisation configuration of an STM-1 ADD/DROP MULTIPLEXER.

FIG. 4 shows the Synchronisation arrangements in an STM-1 ADD/DROP MULTIPLEXER shelf for example where the possible input to the timing circuit is 2 MHz clock extracted from the Optical line, the 2 MHz clock supplied by an SSU or the internal timing source of the shelf.

In a typical network, a single Primary Reference Clock (occasionally another is used for redundancy) is used as the master timing reference for the network. All SDH Network Elements are referenced to this source. The Network synchronisation topology will ideally be designed to provide NEs with alternative synchronisation trails to the PRC for back-up in the event of failure of the original route.

Synchronisation is normally passed along the synchronisation trails in master-slave fashion with each NE responsible for forwarding synchronisation to the next NE in the chain.

Each NE unilaterally chooses its synchronisation source based on a synchronisation source selection algorithm or alternatively by manual intervention. For redundancy purposes, a network has more than one access point for a PRC or a duplicate PRC. However the synchronisation flow is so set up that all NEs normally derive synchronisation via one access point/PRC.

Each Network Element Clock is locked to an external synchronisation signal traceable back to the PRC. As synchronisation is passed along the chain it may become impaired due to jitter and wander accumulation from the Network Element clocks through which it passes. At specific points along the synchronisation trail the clock is extracted and filtered in high performance clock equipment known as Synchronisation Source Supply units (SSUs), before being reinserted back into the trail.

The actual locations at which the SSUs are deployed within a network are dictated by the size of the synchronisation network. A synchronisation path can travel through a number of clocks of different types, the maximum number of SSU and NE clocks types allowed per path is set by G.805.

In the event of a failure in the synchronisation trail, and where no back-up route is available, a node and any nodes slaved from it may become isolated from the PRC. The highest quality node closest to the PRC normally becomes the master clock for the trail, and by entering holdover mode, will maintain alignment with the reference Until the route to the PRC is restored.

The synchronisation function within the Network Element provides timing both internally for use within the Network Element itself, and externally at the external synchronisation Port(s) for incorporation with specific synchronisation equipment (e.g. SSUs).

To compute the sync trails/paths and to analyse the sync paths for loops and islands, the Synchronisation Manager requires information on the physical connectivity between NEs in the network and the actual sync source configuration for each NE.

Preferably the Synchronisation Manager interfaces with a trail database (DB) provided by a Trail Manager application which provides the network elements physical connectivity.

To ensure that the SM is consistent with the network data, the DB is updated when an NE changes it's sync source. This can be achieved by the NEs asynchronously notifying their controllers, whom in turn notify the SM that the sync source has changed. The SM then requests the new information from the NE and updates the DB.

Preferably an Audit facility which periodically looks for changed and new trails within the network could be utilised to also look for changes in the synchronisation information.

The trail database, in addition to physical connectivity, will require additional information to model the required synchronisation information. Preferably this information is provided in the form of templates representative of predetermined configurations. This includes new endpoint templates for each of the four possible timing sources (tributary, aggregate, external and internal), a new Network Element template for the SSU NE, and new connectivity rule templates. The disclosure of applicants co-pending U.S. application Ser. No. 09/010,387 is referred to for further discussion on applicant's template mechanism.

When displaying the sync paths for the complete Network, the user is given the ability to analyse the sync paths, looking for islands and loops.

The sync analysis algorithm performs the following tasks and analysis:

Identify Timing Islands.

Identify Timing Loops.

Count the number of hops from start of a sync trail to PRC.

Count the number of hops in between SSUs.

Figure 5:
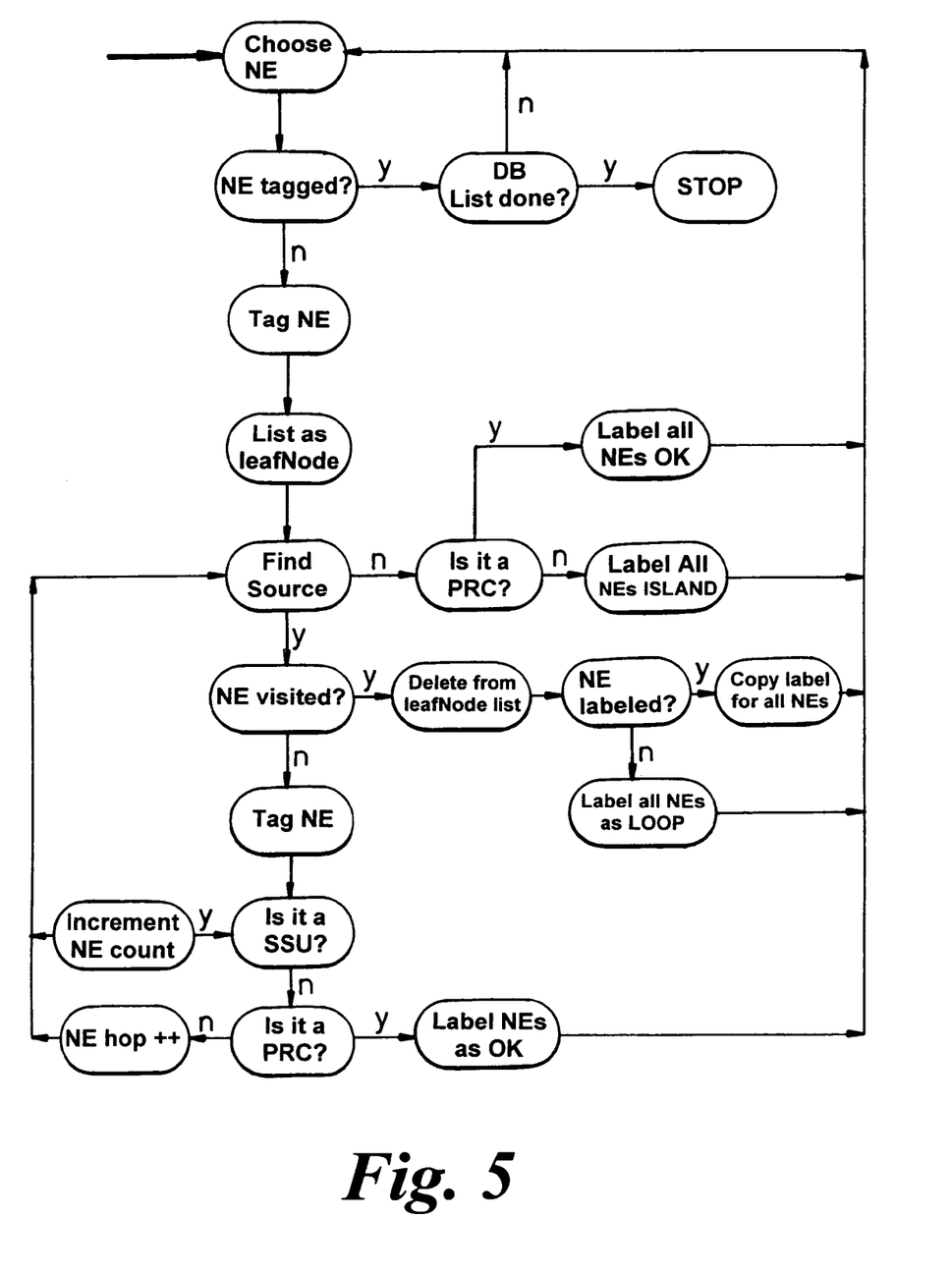
FIG. 5 shows a flow chart of a preferred synchronisation trail finding algorithm of the invention.

FIG. 5 shows a flow chart of the algorithm. The algorithm preferably uses the concept of leafNodes. leafNodes are NEs at the "edge" of the network. For efficiency reasons it is preferable to start the Sync trail search from leafNodes. This eliminates re-visiting nodes and hence improves the performance of the algorithm. The list of leafNodes is created each time the algorithm is run. Alternatively, the list is maintained and updated if necessary so that the starting points in the Sync Trail search is identified.

The algorithm 'tags' the NEs that have already been involved in the Sync Trail and 'labels' each NE as OK if the trail ends up with PRC ISLAND if trail is not traceable back to PRC.

LOOP if sync source is traced back to an NE that is already in the sync path.

DERIVED_LOOP if the NE receives its sync source from a LOOP.

Initially the first NE in the list is chosen. A check is made to see if this NE was involved in the analysis before. If NE is not 'tagged' then it is picked as a start of Sync Trail search and if the NE was tagged the Data Base is worked through 'in order' until an NE is found that is not tagged. When the complete list of NEs is covered the algorithm terminates.

The NE is first tagged so that in the next NE search it is not picked. This NE is now start of sync trail search. Until proven otherwise this NE is considered as a leafNode i.e. an NE at the edge of the network. An object is made to hold this NEs id, the number of NE hops to PRC and intermediate SSUs and all the NE IDs that connect this NE to PRC. The PRCcount is the sum of all SSU counts. List of all leafNodes are maintained.

There are a few reasons why the sync source of an NE can not be found. Either the NE is in fact a PRC in which case the sync trail terminates and the object attributes are updated. Or the NE drives the source internally form its local oscillator. This will be translated as the trail of NEs are forming a Timing Island.

If the timing source and also the NE it is coming from is detected then a check is first made to see if the NE supplying the sync has been visited before. If the answer is yes then a second check is made to see if the NE was part of sync trail island or loop identified earlier. If the NE supplying the sync source was itself part of the timing loop or island then all NEs identified as leading up to this NE will be marked as such.

If the NE has not been visited before then it is first tagged and then a check is made to see if it is an SSU or a PRC.

If the trail has reached an NE where the NE is not a PRC and the NE is not sourced from any other NE, this indicates that all NEs in this trail can not be traced back to PRC and hence the trail is a Timing Island. All NEs in this trail are then labelled accordingly. NEs which are part of sync trail traceable back to PRC are labelled as 'OK'.

If the source NE has been visited before, a check is made to see if this NE was labelled as being part of an Island or Loop. All NEs in the sync trail are then labelled as members of a timing loop. If NE is not labelled and the sync trail search has ended up on the same NE then criteria is meet for a Timing loop detection and the NE is labelled as "LOOP". The label for the all NEs in the sync trail is then applied accordingly.

The number of hops from a selected NE back to PRC is calculated and also the number of NEs in between SSUs. A check is then made to see if numbers are below specified thresholds.

Figure 6:
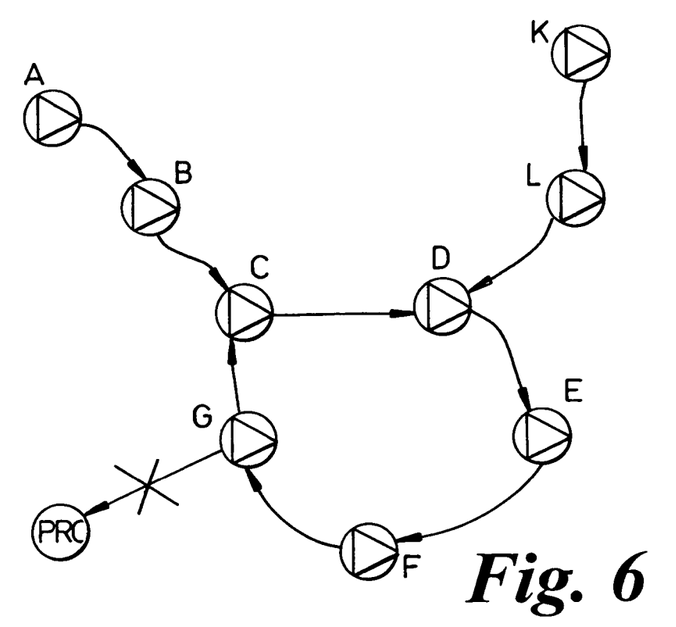
FIG. 6 shows an example of a network synchronisation plan.

In the network of FIG. 6 the PRC source for the sub-network has failed. Node G has reverted to its secondary sync source. The algorithm considers nodes A and K as leafnodes. Assuming we start from an arbitrary point in the list of NEs (say F) then we detect E as being the sync source for F and D for E etc. Because the sync trail is in a loop the search comes back to node F. None of the nodes at this point are labelled. Node F is already been visited so it is labelled as "LOOP".

Figure 7:
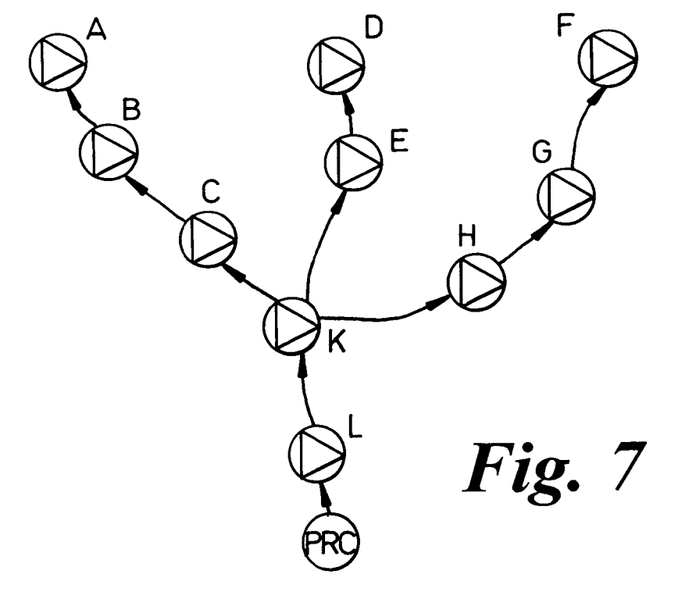
FIG. 7 shows a second example of a network synchronisation plan.

The network of FIG. 7 is a valid sync configuration. Assuming the search starts at node E, the sync trail is terminated successfully at PRC. The next sync trail search could start from:

Node D which is traced back to E which is already visited.
E is labelled as OK so search stops.

Node C. C is traced back to K which is already visited.

To populate the Database with synchronisation data, preferably templates which describe the NEs and what they support are sent, then the actual data is sent in the form of Endpoints and Connections. The templates include sync data and the sync sources of the NE are represented as connections when the connection data is sent up.

The synchronisation information required from the NEs and hence to be reported by the MOAs to the DB includes:

The active sync source;

Sync source hierarchy;

Quality level of the NE (the derived quality level);

The output sync signal and where appropriate the output source hierarchy.

Notification of Sync source changes.

Figure 8:
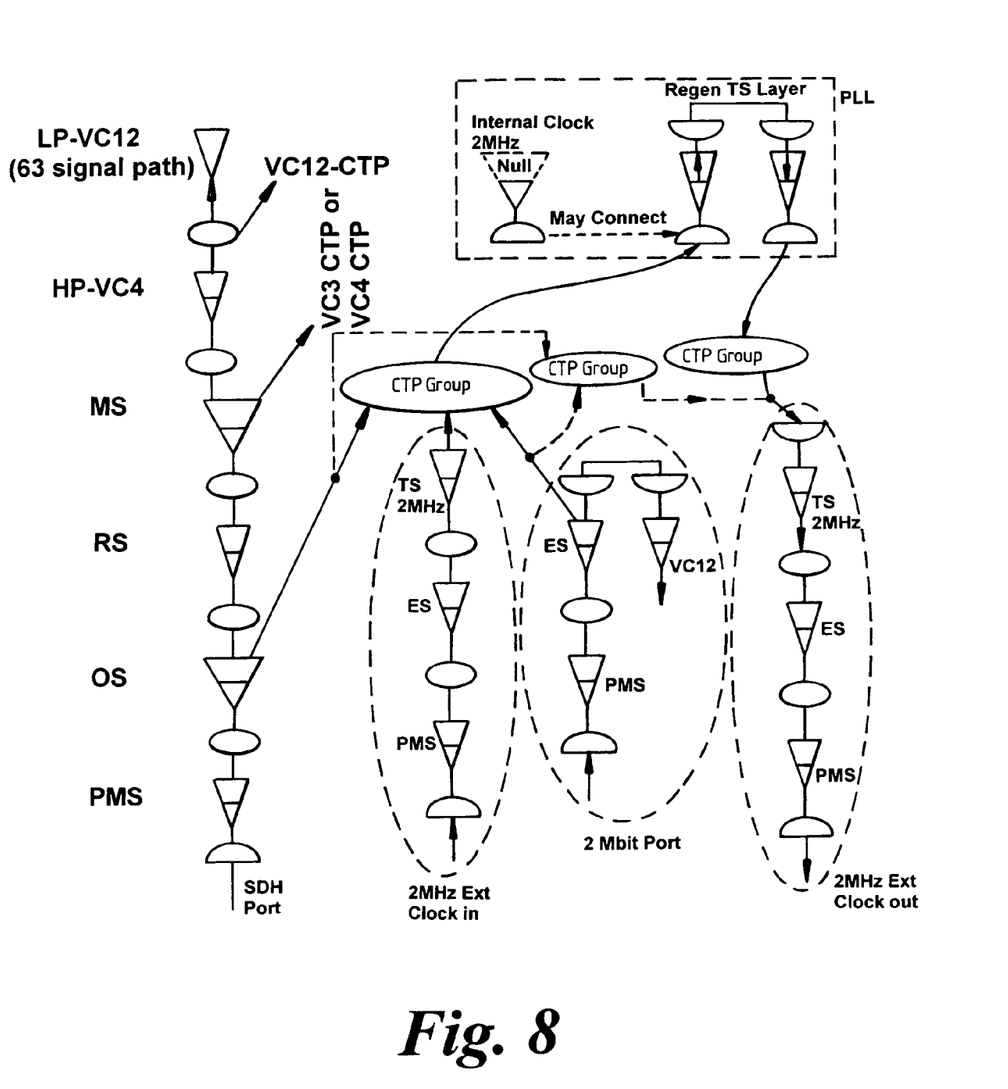
FIG. 8 shows a template representation for a STM-1 ADD/DROP MULTIPLEXER.

Templates are static data, held by the MOAs and the preferred connectivity manager, which describe or model particular parts of an NE (e.g. the NE itself, Endpoints, CTP groups etc.). EndPoints are registered as instances of templates, which they refer to and are normally anchored in the physical layer. An example of a template, up-issued to include the synchronisation information, for the STM-1 ADD/DROP MULTIPLEXER NE is shown in FIG. 8.

The trail template data is used to model the TN-IX NEs endpoints and connection rules. A new timing section layer (TS) is included. This is not a change to the template mechanism, just the static template data. This new layer models the synchronisation connections on the network elements. The sync signals passed around the network can then be modelled as sync trails using the connections within this layer.

In the STM-1 ADD/DROP MULTIPLEXER example, the existing templates for the Aggregate port and Trib ports need to be adjusted for the addition of the sync layer. And new templates for External 2 MHz clocks (input and output) as well as the internal sync source and the PLL input are defined.

The endpoint that represents the NE's timing port (Phase Lock loop) can have a number of connections one for each priority in the sync hierarchy.

CTP group connectivity rules include the following:

No connection between the sync sources allowed.

At any one time only one of the sync sources may connect to PLL.

The output of the PLL may connect to external sync source.

An input Sync source may connect directly to the external output sync source.

An input Sync source must not connect directly to the external output sync source as well as the PLL.

The endpoint that represents the NE's timing port (Phase Lock Loop) can have a number of connections one for each priority in the sync hierarchy.

Figure 9:
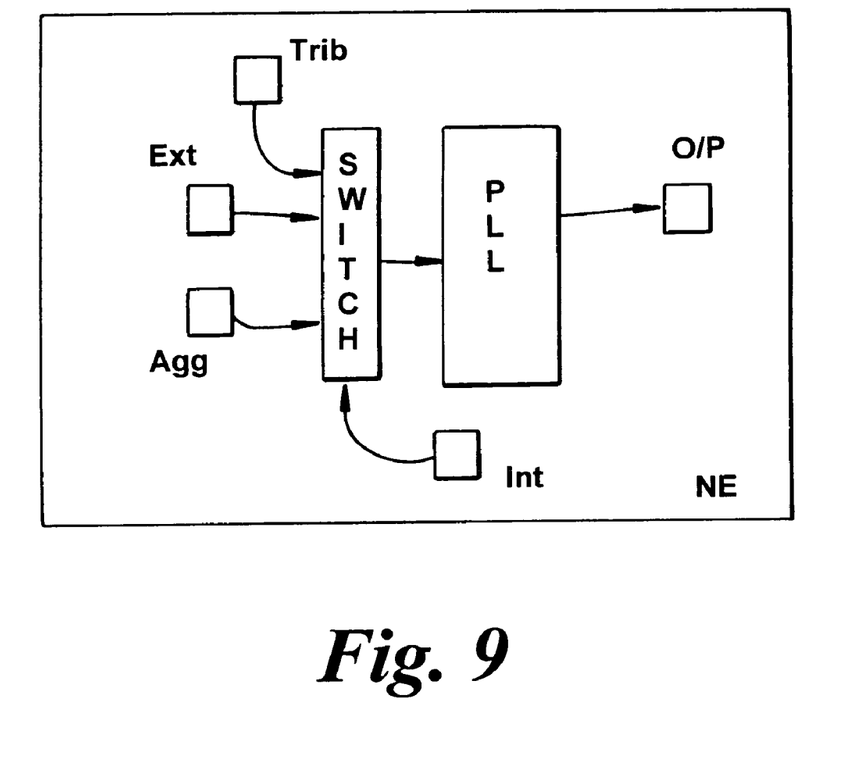
FIG. 9 shows the sync source points for a STM-1 ADD/DROP MULTIPLEXER.

All EndPoint information is sent up by the MOA to SM and the Endpoints refer to unique template numbers. Endpoints are defined for all Sync source points as shown in the example in FIG. 9.

There are two categories of templates, these are Endpoint and CTP group templates. Endpoint templates are static data held by the MOAs describing a particular type of an Endpoint and CTP templates describe the connectivity capabilities between Endpoint templates.

Endpoint templates are used for all External Source Input (ESI), External Source Output (ESO) ports, as well as for the Phase Lock Loop attribute, this will contain the timing qualities of the network element. CTP group templates are also defined to identify the type and range of get and set operations that can be performed in the synchronization domain.

Logical endpoints or ports represent the Phase Lock Loop (PLL) which represents the quality of timing for the Network Element. Endpoints or ports also represent the External Source Input and Outputs ports. The new ports are enrolled along with the existing card ports.

The synchronisation data such as the active source and quality levels are requested via the get connections request to the MOA. An audit process runs periodically to obtain this data.

What is claimed is:

1. In a communications network comprising a plurality of network elements, a method of providing management data describing synchronization trail information for said network elements, said method comprising:
   obtaining network element synchronization data;
   obtaining network element connectivity data; and
   computing synchronization trail information for said network elements from said synchronization data and said connectivity data,
wherein computing the synchronization trail information comprises:
   selecting a network element as a start of a synchronization trail; and
   following the synchronization trail to the synchronization source of the network element using said synchronization data and said connectivity data.

2. In a communications network comprising a plurality of network elements, a method of providing management data describing synchronization trail information for said network elements, said method comprising:
   obtaining network element synchronization data;
   obtaining network element connectivity data; and
   computing synchronization trail information for said network elements from said synchronization data and said connectivity data,
wherein computing the synchronization trail information comprises preferentially selecting leafNode network elements of the network as a start of a synchronization trail.

3. A method according to claim 2 wherein computing the synchronization trail information comprises
   following the synchronization trail to the synchronization source of the selected network element using said synchronization data and said connectivity data;
   tagging all the network elements involved in synchronization trails as they are followed; and
   discarding tagged network elements as the start of subsequent synchronization trails.

4. In a communications network comprising a plurality of network elements, a method of providing management data describing synchronization trail information for said network elements, said method comprising:
   obtaining network element synchronization data;
   obtaining network element connectivity data; and
   computing synchronization trail information for said network elements from said synchronization data and said connectivity data,
wherein computing the synchronization trail information comprises the steps of:
   counting the number of hops from a network element at the start of synchronization trail to a primary reference clock.

5. A data representation of a physical resource operating in accordance with a protocol having a plurality of layers, the representation further comprising a timing layer representing synchronization trail information, the data representation being stored in a computer readable medium.

* * * * *